United States Patent [19]

Fertig

[11] Patent Number: 5,046,825
[45] Date of Patent: Sep. 10, 1991

[54] LIQUID CRYSTAL CELL WITH PICTURE ELECTRODE INTERFERENCE LAYER COVERING METALLIC FEED LINES

[75] Inventor: Werner Fertig, Darmstadt, Fed. Rep. of Germany

[73] Assignee: VDO Adolf Schindling AG, Frankfurt am Main, Fed. Rep. of Germany

[21] Appl. No.: 576,122

[22] Filed: Aug. 24, 1990

Related U.S. Application Data

[63] Continuation of Ser. No. 152,616, Feb. 5, 1988, abandoned.

[30] Foreign Application Priority Data

Feb. 19, 1987 [DE] Fed. Rep. of Germany ....... 3705259

[51] Int. Cl.$^5$ ............................................. G02F 1/133
[52] U.S. Cl. ........................................ 359/87; 359/62
[58] Field of Search ................... 350/334, 336, 339 F, 350/339 R

[56] References Cited

U.S. PATENT DOCUMENTS

| | | | |
|---|---|---|---|
| 3,932,026 | 1/1976 | Sprokel | 350/ |
| 4,006,968 | 2/1977 | Ernstoff et al. | 350/339 F |
| 4,556,288 | 12/1985 | Sekimura | 350/339 D |
| 4,639,088 | 1/1987 | Suginoya et al. | 350/339 F |
| 4,697,886 | 10/1987 | Ito et al. | 350/339 F |
| 4,810,063 | 3/1989 | Fergason | 350/339 R |
| 4,820,024 | 4/1989 | Nishiura | 350/339 R |

FOREIGN PATENT DOCUMENTS

| | | | |
|---|---|---|---|
| 0006566 | 6/1979 | European Pat. Off. | |
| 2533705 | 7/1975 | Fed. Rep. of Germany | |
| 3135552 | 9/1981 | Fed. Rep. of Germany | |
| 0052618 | 3/1983 | Japan | 350/339 R |
| 0073524 | 4/1985 | Japan | 350/339 F |
| 2056739 | 3/1981 | United Kingdom | |

Primary Examiner—Stanley D. Miller
Assistant Examiner—Anita Pellman Gross
Attorney, Agent, or Firm—Martin A. Farber

[57] ABSTRACT

In a liquid crystal cell having metallic conductor paths which serve as feed lines to picture electrodes, the metallic conductor paths are provided with an interference layer. This layer can consist of a material which forms the picture electrodes.

3 Claims, 1 Drawing Sheet

LIQUID CRYSTAL CELL WITH PICTURE ELECTRODE INTERFERENCE LAYER COVERING METALLIC FEED LINES

RELATED APPLICATION

This application is a continuation of my co-pending application Ser. No. 07/152,616 filed Feb. 5, 1988 and now abandoned.

FIELD AND BACKGROUND OF THE INVENTION

The present invention relates to a liquid crystal cell having metallic conductor paths or tracks.

Particularly for high-resolution displays liquid crystal cells with low ohmic feed lines to the picture electrodes are required. Such liquid crystal cells therefore use metallic conductor paths which are not transparent and which have a reflective surface. The latter leads to a reduction in contrast upon operation with incident light and to a reduction in contrast upon transmitted-light operation under incident-light conditions.

SUMMARY OF THE INVENTION

It is an object of the present invention substantially to avoid this reduction in contrast.

According to the invention, the metallic conductor paths (3) are provided with an interference layer (4, 7, 8).

As a result of this, the contrast is substantially improved without the cost of the liquid crystal cell being substantially increased by a more expensive method of manufacture.

Another feature of the invention is that the interference layer (4) consists of a transparent insulator and is applied substantially over the entire surface of the liquid crystal cell which bears the conductor paths (3). This feature has the advantage that many different materials can be used to produce this layer. A specific physical structure of this layer is not necessary.

Another feature provides that the interference layer (7) consists of anodic oxide applied selectively to the conductor paths (3). In this case, the structuring of the interference layer corresponding to the conductor paths is obtained without practically any additional expense by the anodic application of the oxide layer.

In accordance with another feature, the interference layer (8) consists of a material which forms the picture electrode. In this case, the structured application of the interference layer is effected with the same method steps and apparatus (masks) as the application of the picture electrode which is in any event necessary. As material for the picture electrodes in the interference layer, indium-tin-oxide is advantageous here.

BRIEF DESCRIPTION OF THE DRAWING

With the above and other objects and advantages in view, the present invention will become more clearly understood in connection with the detailed description of a preferred embodiment, when considered with the accompanying drawing, of which.

Identical parts are provided with the same reference numbers in the figures. In each figure, only the substrate assembly on one side of the liquid crystal material is shown, it being understood that a second substrate and electrode structure is present on the other side of the liquid crystal material.

DETAILED DESCRIPTION OF THE PREFERRED EMBODIMENT

Figure 1:
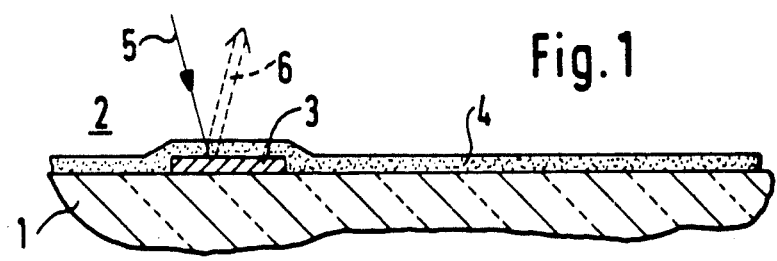
FIG. 1 is a section through a liquid crystal cell of the invention.
Figure 2:
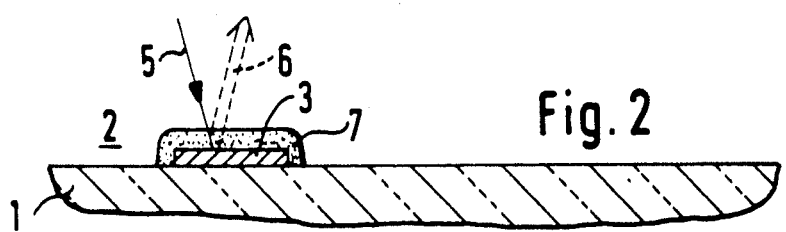
FIG. 2 is a section through another embodiment of the liquid crystal cell of the invention.
Figure 3:
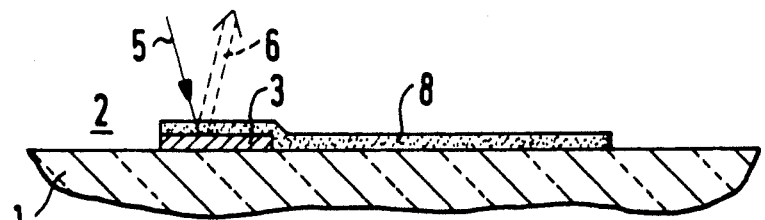
FIG. 3 is a section through still another embodiment of the liquid crystal cell of the invention.

Each of FIGS. 1 to 3 shows a detail of a liquid crystal cell of the invention, shown in cross section, in order to explain one embodiment. In all cases a metallic conductor path 3 is present on a substrate (glass) 1 on the surface facing the inside (2) of the liquid crystal cell.

In the embodiment shown in FIG. 1, the interference layer consists of a layer 4 of a transparent electrical insulator, for instance $TiO_2$, $SiO_2$ or $Si_3N_4$, this layer covering the entire surface. Since this layer is non-conductive and transparent, all conductor paths and picture electrodes can be covered with this layer without the function of the liquid crystal cell being disturbed thereby.

Incident light 5 is reflected both on the surface of the metallic conductor path 3 and on the surface of the interference layer 4. By a suitable thickness of the interference layer 4 the result is obtained that the total reflected light is extinguished in a substantial part of the visible region of the electromagnetic spectrum with the angles of incidence which normally occur in the viewing of liquid crystal displays.

In the embodiment shown in FIG. 2, the conductor path 3 is provided with an anodic oxide layer 7 which consists, for instance, of $Al_2O_3$ and $Ta_2O_5$. Methods of applying such layers are known per se and need not be further explained here.

In the embodiment shown in FIG. 3 the conductor paths are overlapped by a transparent picture electrode 8 which consists preferably of indium-tin-oxide. In this way the conductor paths are provided with an interference layer at the same time as the picture electrodes are produced. In all of the embodiments, the thickness of the transparent insulating layer is approximately one-quarter wavelength of the visible light impinging on a front surface of the display and propagating through the display toward the substrate, which is located on the back side of the the display.

I claim:

1. A liquid crystal display cell comprising
    a plurality of picture electrodes; and
    a plurality of metallic conductor paths serving as feed lines to respective ones of the picture electrodes; and
    wherein each of said picture electrodes overlies a respective one of the conductor paths and has a predesignated thickness to serve as an interference layer covering the metallic conductor path for reduction of reflection of light from the metallic conductor path.

2. A display cell according to claim 1, wherein said material of the interference layer is indium-tin-oxide.

3. A liquid crystal display cell comprising
    a plurality of picture electrodes;
    metallic conductor paths serving as feed lines to respective ones of the picture electrodes; and
    wherein each of said picture electrodes is constructed as an interference layer covering a respective one of the metallic conductor paths; and
    the interference layer has a thickness of approximately one-quarter wavelength of incident light for destructive interference of light rays reflected from a conductive path and the interference layer, thereby to improve contrast of the liquid crystal display.

* * * * *